(12) United States Patent
Shannon et al.

(10) Patent No.: US 12,569,982 B2
(45) Date of Patent: Mar. 10, 2026

(54) SYSTEMS, DEVICES, AND METHODS FOR A HYDRAULIC ROBOTIC ARM

(71) Applicant: Sanctuary Cognitive Systems Corporation, Vancouver (CA)

(72) Inventors: Connor Richard Shannon, Vancouver (CA); George E. G. Sterling, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 965 days.

(21) Appl. No.: 17/749,536

(22) Filed: May 20, 2022

(65) Prior Publication Data

US 2022/0371183 A1 Nov. 24, 2022

Related U.S. Application Data

(60) Provisional application No. 63/191,732, filed on May 21, 2021.

(51) Int. Cl.
| | |
|---|---|
| *B25J 9/14* | (2006.01) |
| *B25J 15/00* | (2006.01) |
| *F15B 1/04* | (2006.01) |
| *F15B 1/26* | (2006.01) |
| *F15B 13/02* | (2006.01) |
| *B62D 57/032* | (2006.01) |

(52) U.S. Cl.
CPC ............. *B25J 9/14* (2013.01); *B25J 15/0009* (2013.01); *F15B 1/04* (2013.01); *F15B 1/26* (2013.01); *F15B 13/02* (2013.01); *B62D 57/032* (2013.01)

(58) Field of Classification Search
CPC ... B25J 9/14; B25J 9/144; B25J 15/009; B25J 18/00; F15B 1/04; F15B 1/26; F15B 13/02
See application file for complete search history.

(56) References Cited

U.S. PATENT DOCUMENTS

| | | | | |
|---|---|---|---|---|
| 4,575,297 A | * | 3/1986 | Richter | ............... B25J 15/0009 414/730 |
| 10,518,372 B2 | * | 12/2019 | Bergeron | ............... B25J 9/0006 |

(Continued)

FOREIGN PATENT DOCUMENTS

| | | |
|---|---|---|
| CN | 206780402 U | 12/2017 |

OTHER PUBLICATIONS

International Search Report, PCT/CA2022/050810, Aug. 24, 2022.

*Primary Examiner* — Sang K Kim
(74) *Attorney, Agent, or Firm* — Thomas Mahon

(57) ABSTRACT
A robot includes a body, a first robotic arm physically coupled to the body, and a first discrete hydraulic system comprising a first plurality of hydraulic components. The first robotic arm includes a first end effector. The first hydraulic system is operable to control the first end effector. The first plurality of hydraulic components are integrated with the first robotic arm. In some implementations, the robot includes a second robotic arm physically coupled to the body, and a second discrete hydraulic system consisting of a second plurality of hydraulic components. The second robotic arm includes a second end effector. The second hydraulic system is operable to control the second end effector. The second plurality of hydraulic components are integrated with the second robotic arm. The second hydraulic system is hydraulically-isolated from the first hydraulic system.

19 Claims, 10 Drawing Sheets

(56) References Cited

U.S. PATENT DOCUMENTS

| 11,639,004 | B2* | 5/2023 | Khadivinassab | ...... B25J 13/084 |
| | | | | 294/106 |
| 12,162,138 | B2* | 12/2024 | Shannon | .................. B25J 15/08 |
| 2019/0224856 | A1 | 7/2019 | Cerruti et al. | |

* cited by examiner

SYSTEMS, DEVICES, AND METHODS FOR A HYDRAULIC ROBOTIC ARM

TECHNICAL FIELD

The present systems, devices, and methods generally relate to robotics, and particularly relate to hydraulically-actuated robotic arms.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

BRIEF SUMMARY

A robot may be summarized as including a body, a first robotic arm physically coupled to the body, the first robotic arm comprising a first end effector, and a first hydraulic system comprising, or consisting of, a first plurality of hydraulic components, the first hydraulic system operable to control the first end effector, wherein the first plurality of hydraulic components are integrated with the first robotic arm.

In some implementations, the robot may further include a second robotic arm physically coupled to the body, the second robotic arm comprising a second end effector, and a second hydraulic system comprising, or consisting of, a second plurality of hydraulic components, the second hydraulic system operable to control the second end effector, the second plurality of hydraulic components integrated with the second robotic arm, wherein the second hydraulic system is hydraulically-isolated from the first hydraulic system.

In some implementations, the robot may further include a second robotic arm physically coupled to the body, the second robotic arm comprising a second end effector, and a second hydraulic system comprising, or consisting of, a second plurality of hydraulic components, the second hydraulic system operable to control the second end effector, the second plurality of hydraulic components integrated with the second robotic arm, wherein the first hydraulic system and the second hydraulic system share a common hydraulic pump. The common hydraulic pump may be integrated with (e.g., carried within or carried on) the robot (e.g., in the torso of the body or on the back of the body).

In some implementations, the first hydraulic system may include one or more actuators integrated with the first end effector, the first hydraulic system operable to control the first end effector by the one or more actuators. The first end effector may be a hand, the hand may comprise a plurality of digits, and each digit of the plurality of digits may comprise at least one respective actuator of the one or more actuators. Each digit of the plurality of digits may comprise a respective plurality of actuators of the one or more actuators. Each of the one or more actuators may provide a respective degree of freedom. The one or more actuators may provide at least eighteen (18) degrees of freedom.

In some implementations, the first plurality of hydraulic components may be located in an interior of the first robotic arm. The first robotic arm may be a humanoid arm.

In some implementations, at least one hydraulic component of the first plurality of hydraulic components may be mounted on an exterior surface of the first robotic arm.

In some implementations, the first plurality of hydraulic components may include a motor, a plurality of drive pistons, each drive piston mechanically coupled to the motor, a set of actuators, each actuator comprising an actuation piston, each actuation piston operable to drive a respective actuation of the first end effector, and a plurality of hoses, each hose of the plurality of hoses containing a respective volume of a hydraulic fluid, each hose hydraulically coupled to a respective drive piston at a respective first end and hydraulically coupled to a respective actuation piston at a respective second end.

In some implementations, the first plurality of hydraulic components may include a hydraulic pump, a reservoir for storing a first partial volume of a hydraulic fluid, the reservoir hydraulically coupled to an inlet of the hydraulic pump, the reservoir configurable to provide a positive pressure to the inlet of the hydraulic pump, an accumulator for holding a second partial volume of the hydraulic fluid under pressure, the accumulator hydraulically coupled to an outlet of the hydraulic pump, a set of actuators, each actuator comprising an actuation piston, each actuation piston operable to drive a respective actuation of the first end effector, a plurality of hoses, each hose of the plurality of hoses containing a respective volume of the hydraulic fluid, a plurality of pressure valves, each pressure valve operable to control a hydraulic coupling of the accumulator to a respective actuation piston via a respective first at least one of the plurality of hoses, and a plurality of exhaust valves, wherein each exhaust valve is operable to control a hydraulic coupling of the respective actuation piston to the reservoir via a respective second at least one of the plurality of hoses. The plurality of pressure valves may include at least one electrohydraulic servo pressure valve, each electrohydraulic servo pressure valve operable to control the hydraulic coupling of the accumulator to the respective actuation piston, and the plurality of exhaust valves may include at least one electrohydraulic servo exhaust valve, each electrohydraulic servo exhaust valve operable to control the hydraulic coupling of the respective actuation piston to the reservoir. The robot may further include a controller, the controller operable to open and close the at least one electrohydraulic servo pressure valve and the at least one electrohydraulic servo exhaust valve.

In some implementations, the first plurality of hydraulic components may include a hydraulic pump, a reservoir hydraulically coupled by a first hose to an inlet of the hydraulic pump, an accumulator hydraulically coupled by a second hose to an outlet of the hydraulic pump, a first pressure valve, a first port of the first pressure valve hydraulically coupled by a third hose to the accumulator, an actuator hydraulically coupled by a fourth hose to a second port of the first pressure valve, and a first exhaust valve, a first port of the first exhaust valve hydraulically coupled by a fifth hose to the actuator, a second port of the first exhaust valve hydraulically coupled by a sixth hose to the reservoir, wherein the hydraulic pump, the reservoir, the accumulator, the first pressure valve, the first exhaust valve, the actuator, and the first, the second, the third, the fourth, the fifth, and the sixth hoses form a hydraulic circuit. A respective outer diameter of each of the first, the second, the third, the fourth, the fifth, and the sixth hoses may be less than or equal to one-sixteenth of an inch ($\frac{1}{16}$ in.). The actuator may include a single actuation piston. The first plurality of hydraulic components may further include a second pressure valve, a first port of the second pressure valve hydraulically coupled by a seventh hose to the accumulator and a second port of the second pressure valve hydraulically coupled by an eighth hose to the actuator, and a second exhaust valve, a first port of the second exhaust valve hydraulically coupled by an ninth hose to the actuator and a second port of the second exhaust valve hydraulically coupled by a tenth hose to the reservoir, wherein the actuator comprises a double actuation piston, and whereby the actuator becomes double-acting. The first port of the first pressure valve may be hydraulically coupled by the third hose to the accumulator via a pressure manifold, and the second port of the first exhaust valve may be hydraulically coupled by the tenth hose to the reservoir via an exhaust manifold.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
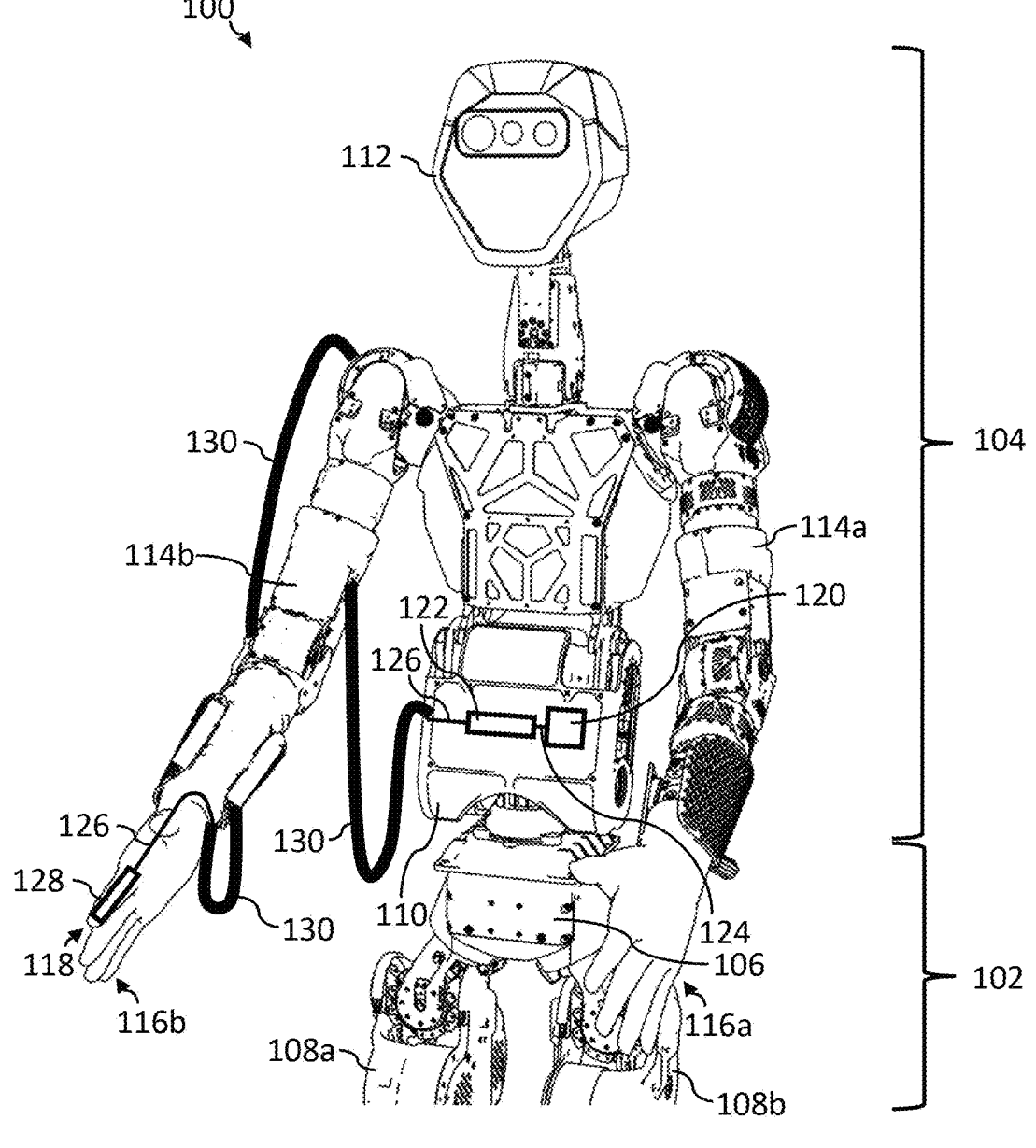
FIG. 1 is a schematic drawing of an example implementation of a hydraulically-powered robot with an externally-routed bundle of hoses, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

Overview of Some Aspects of the Present Systems, Devices, and Methods

The various implementations described herein provide systems, devices, and methods for hydraulically-powered robots. In particular, the present systems, devices, and methods describe hydraulically-powered systems for controlling an end effector of a robot. An aspect of the technology described below includes integration of a hydraulic system to fit inside, and/or on an exterior surface, of a robotic arm. In some implementations, at least some components of the hydraulic system are confined to the forearm, wrist, and hand of a humanoid arm and used to control an end effector (e.g., a humanoid robotic hand) physically coupled to the humanoid arm. Another aspect of the technology described below includes a hydraulic system with a common pump.

Technology described in the present systems, devices, and methods can reduce, or eliminate, external hydraulic hoses that run from a motor housed in proximity to, or in a base of, a robot to an end effector. In accordance with the present systems, devices, and methods, some or all of a hydraulic system powering the end effector can be at least partially housed within and/or routed inside the robot. In some implementations, there is no external routing of the hydraulic system powering the end effector. At least some portions of the hydraulic system can be adapted and/or miniaturized to fit inside the end effector and inside the robotic arm to which the end effector is attached. A hydraulic system for powering a robotic hand of a humanoid robot can be configured to fit inside an arm of the robot and/or inside the hand, for example. The arm of a humanoid robot may include a forearm and a wrist through which the hydraulic system may pass en route to the hand.

In some applications of robotic systems in general, and humanoid robots in particular, it can be desirable for end effectors to have sufficient power and precision while fitting within a certain form factor. It can also be desirable for couplings (e.g., cables, hoses, wires, etc.) between the end effector and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

Technology described in the present systems, device, and methods includes hydraulic systems to provide power to an end effector of a robotic system (e.g., to a hand of a humanoid robot), wherein some or all of the hydraulic system is adapted and/or miniaturized to fit at least partially inside the robot (e.g., inside a robotic arm). In some implementations, the hydraulic system is routed through a forearm and/or wrist of the robotic arm to a robotic hand. In some implementations, the hydraulic system is routed through an elbow and/or a shoulder. In some applications, it can be desirable (e.g., for ease of operation of the robot) for the hydraulic system to avoid routing through the elbow, shoulder, and/or other joints and pivot points.

More generally, technology described in the present application includes hydraulic systems routed between a pump/motor and an end effector or an actuator in a robotic system. The hydraulic system may be dedicated to one or more end effectors or actuators. The hydraulic system may be localized, i.e., routing between a pump/motor and an actuator may be local to the actuator.

An object or shape is defined as humanoid when it has an appearance or a character resembling that of a human. For example, a humanoid robot is a robot having an appearance or a character resembling that of a human. A humanoid robot may be "humanoid" in its entirety or may have humanoid components (e.g., a torso, head, arms, and hands) coupled to non-humanoid components (e.g., a wheeled base). While the following description focuses mainly on controlling a robotic hand of a humanoid robot, a person of skill in the art will appreciate that a hydraulic system in accordance with the present systems, devices, and methods may be used to control a hand, a foot, a tail, a head, or any applicable end effector or actuator.

Advantages of Using Hydraulic Systems in Robotic Systems

Using hydraulics to drive a robotic arm and/or an end effector can be advantageous for reasons that include the following:

Hydraulics can provide high speed and strength within a humanoid envelope of shape and size.

To accommodate humanoid envelope constraints, components (e.g., a motor) can be located outside of regions where volume is constrained, or outside of the envelope entirely if desired, and hydraulically coupled to components in volume-constrained regions of the envelope. Throughout this specification and the appended claims, components of a hydraulic system are said to be "hydraulically coupled" if the components are coupled by a hydraulic fluid. For example, two components, such as a motor and piston, or a pump and valve, are hydraulically coupled if they are coupled together by at least one tube or hose containing hydraulic fluid.

Hydraulics can provide a high power density especially if the motor is outside the constrained volume.

Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded.

Hydraulics can provide centralized power and thereby apply full power onto a single degree of freedom (DOF).

Hydraulics can provide high-fidelity control of the robot, i.e., high precision in the movement of the robot.

Hydraulically-Powered Robots

FIG. 1 is a schematic drawing of an example implementation of a hydraulically-powered robot 100 with an externally-routed bundle of hoses 130, in accordance with the present systems, devices, and methods. Robot 100 comprises a base 102 and a humanoid upper body 104. Base 102 comprises a pelvic region 106 and two legs 108a and 108b (collectively referred to as legs 108). Only the upper portion of legs 108 is shown in FIG. 1. In other example implementations, base 102 may comprise a stand and (optionally) one or more wheels.

Upper body 104 comprises a torso 110, a head 112, a left-side arm 114a and a right-side arm 114b (collectively referred to as arms 114), and a left hand 116a and a right hand 116b (collectively referred to as hands 116). Arms 114 are also referred to in the present application as robotic arms. Arms 114 of robot 100 are humanoid arms. In other implementations, a different number (e.g., fewer such as 1, or more such as 3, 4, 5, or so on) of arms 114 may be included and/or an or all of arms 114 may have a form factor that is different from a form factor of a humanoid arm. Hands 116 are also referred to in the present application as end effectors. In other implementations, hands 116 have a form factor that is different from a form factor of a humanoid hand. Each of hands 116 comprises one or more digits, for example, digit 118 of hand 116b. Digits may include fingers, thumbs, or similar structures of the hand or end effector.

In some implementations, base 102 and/or torso 110 of upper body 104 house hydraulic drive mechanisms, for example. In some implementations, hydraulic drive mechanisms may be used on the back of upper body 104, e.g., in a backpack. In the example implementation of FIG. 1, the hydraulic drive mechanism includes a motor 120 and a drive piston 122. Drive piston 122 can be propelled forward linearly by a leadscrew (not shown in FIG. 1) that can be coupled to motor 120 through a flexible shaft coupler 124. Drive piston 122 can be hydraulically coupled to a hose 126 containing a hydraulic fluid. Hose 126 can extend from drive piston 122 to an actuation piston 128 located elsewhere on robot 100, for example (as illustrated in FIG. 1) in hand 118b. The hydraulic fluid in hose 126 can be an oil, for example, such as peanut oil or mineral oil. When drive piston 122 is driven by motor 120, actuation piston 128 can be forced to move, which can cause a corresponding motion of at least a portion of robot 100.

Each of hands 118 may have more than one degree of freedom (DOF). In some implementations, each hand has up to eighteen (18) DOFs, or even more. Examples of individual DOFs for each of hands 118 may include, without limitation: bending, rotation, or pivoting at individual finger joints (e.g., one, two, or three joints per finger, with at least one, and sometimes multiple, DOFs per joint), and various (e.g., one, two, or three) rotations of the hand. Each DOF can be driven by a respective actuation piston (for example, actuation piston 128). For clarity of illustration, only one actuation piston is shown in FIG. 1. Each actuation piston may be located in hands 118.

Examples of systems, methods, and devices for robot end effectors, including robot hands and/or robot fingers, that may be used (e.g., as either or both of hands 118) in some implementations of the present systems, devices, and methods include those described in U.S. patent application Ser. No. 17/098,716; U.S. Provisional Patent Application Ser. No. 63/086,258, filed Oct. 1, 2020 and entitled "Robotic End Effector" (now U.S. patent application Ser. No. 17/491,577); and U.S. Provisional Patent Application Ser. No. 63/342,414, filed May 16, 2022, and entitled "SYSTEMS, DEVICES, AND METHODS FOR A ROBOTIC JOINT", all of which are incorporated by reference herein in their entirety.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses (for example, hose 126) running from drive pistons (for example, drive piston 122) to each of hands 118 to control eighteen (18) DOFs of each hand. For example, in FIG. 1, robot 100 includes hose 126 that runs from drive piston 122 to actuation piston 128 in digit 118 of hand 116b. Hose 126 belongs to a bundle of hoses 130 that passes behind, or alongside, torso 110 and around the outside of arm 114b. In some implementations, bundle 130 can accommodate twenty (20) one-eighth inch (⅛ in.) hoses.

A shortcoming of the implementation of robot 100 shown in FIG. 1 can be a presence of external hydraulic coupling (e.g., bundle 130 of FIG. 1) between a motor (e.g., motor 120 of FIG. 1) and actuators on a robot (e.g., actuation piston 128 of FIG. 1). As shown in FIG. 1, a bundle of hydraulic hoses may run between a motor (located, for example, in the base or torso of the robot, or on the back/in a backpack of the robot) and actuators (located, for example, in an end effector at the end of a robotic arm). As described above, in some implementations, there can be twenty (20) one-eighth inch (⅛ in.) hoses, or more, in each bundle 130. As previously described, the bundle of hoses can increase the overall dimensions of the robot, make it harder to fit into restricted spaces, and add a risk the bundle will snag on objects in the robot's environment thereby causing damage to the robot and/or its environment.

Figure 2:
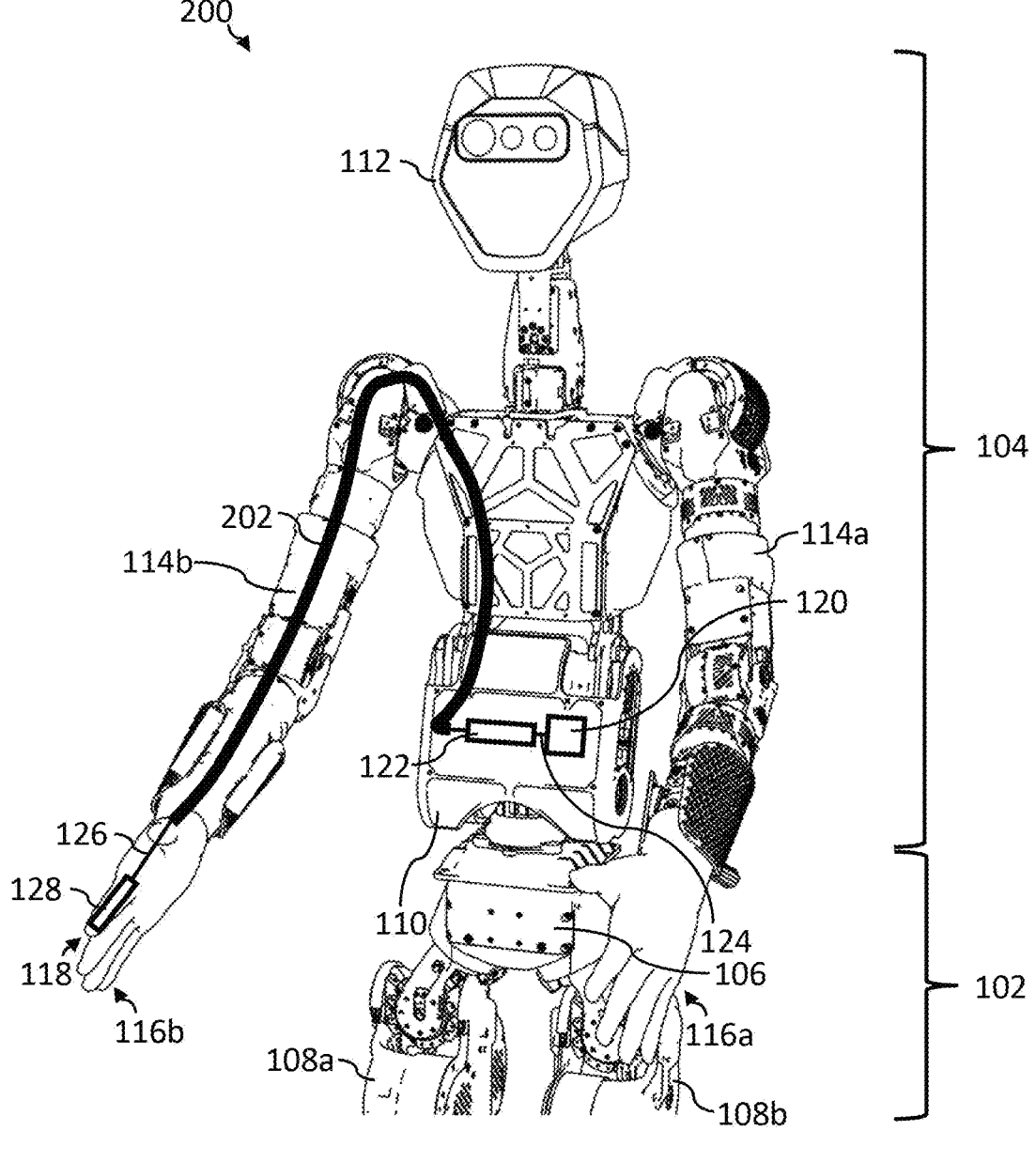
FIG. 2 is a schematic drawing of an example implementation of a hydraulically-powered robot with an internally-routed bundle of hoses, in accordance with the present systems, devices, and methods.

FIG. 2 is a schematic drawing of an example implementation of a hydraulically-powered robot 200 with an internally-routed bundle of hoses 202, in accordance with the present systems, devices, and methods. Components of robot 200 that are the same as, or similar to, components of robot 100 have the same reference numerals.

Robot 200 differs from robot 100 in the way hydraulic hoses are routed from motor 120 in torso 110 to actuation pistons (e.g., actuation piston 128) in hands 116. As described with reference to FIG. 1, robot 100 includes a bundle of hoses 130 that runs externally to torso 110 and arm 114b to hand 116b. By comparison, robot 200 includes a bundle of hoses 202 (including, e.g., hose 126) that runs internally to torso 110 and arm 114b to hand 116b.

Space can be provided internally to torso 110 and arm 114b to accommodate bundle 202, and to allow bundle 202 to be routed internally without interference with other internal components and couplings. In some implementations, a conduit is provided for routing of bundle 202 through torso 110 and/or arm 114b. In some implementations, pass-throughs are provided for bundle 202 at joints and pivot points to help avoid stretching, pinching, kinking, and/or twisting of bundle 202 as components of the robot move relative to one another. In some implementations, those elements (e.g., motor 120) shown in the torso 110 of robot 100 may be housed on the back of robot 100, e.g., in a backpack affixed to or worn by robot 100.

Advantages of internal routing of bundle 202 (vs. external routing of bundle 130 of FIG. 1) include reducing the overall dimensions of robot 200, making it easier for robot 200 to fit into restricted spaces, and reducing a risk bundle 202 will snag on objects in the robot's environment.

Figure 3:
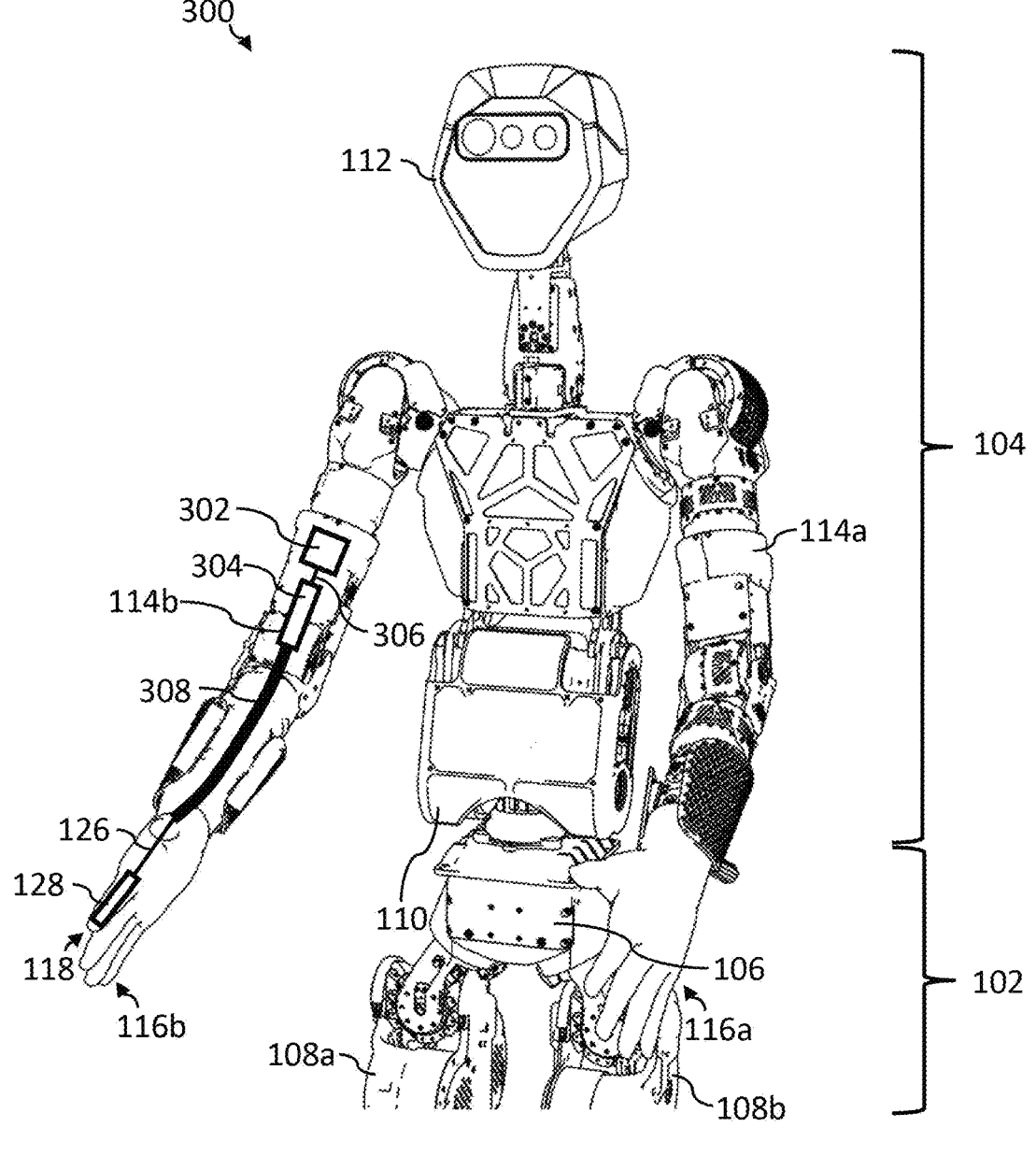
FIG. 3 is a schematic drawing of an example implementation of a hydraulically-powered robot with a motor and a drive piston integrated in an arm of the robot, in accordance with the present systems, devices, and methods.

FIG. 3 is a schematic drawing of an example implementation of a hydraulically-powered robot 300 with a motor 302 and a drive piston 304 integrated in arm 114b of robot 300, in accordance with the present systems, devices, and methods. Components of robot 300 that are the same as, or similar to, components of robot 100 have the same reference numerals.

Unless the specific context requires otherwise, throughout this specification and appended claims, the term "integrated" in relation to integration of hydraulic components with a body (e.g., a robotic arm) refers to the hydraulic components being carried in and/or carried on the body. For example, unless the specific context requires otherwise, integrated hydraulic components may be housed within the body and/or attached to an exterior surface of the body. In various example implementations described in the present application, integrated hydraulic components of a hydraulically-powered robot are housed within an interior of a robotic arm and/or attached to an exterior surface of the arm.

Robot 300 differs from robots 100 and 200 at least in the location of motor 120. Robot 300 includes a motor 302, a drive piston 304, and a flexible shaft coupler 306 integrated with arm 114b. In the example implementation of FIG. 3, motor 302, drive piston 304, and flexible shaft coupler 306 are located in an interior of arm 114b. In other implementations, motor 302, drive piston 304, and/or flexible shaft coupler 306 are located on an exterior surface of arm 114b. Robot 300 further includes a bundle of hoses 308 that includes, for example, hose 126 to actuation piston 128. Bundle 308 is integrated with arm 114b.

Hydraulic Circuits

Figure 4:
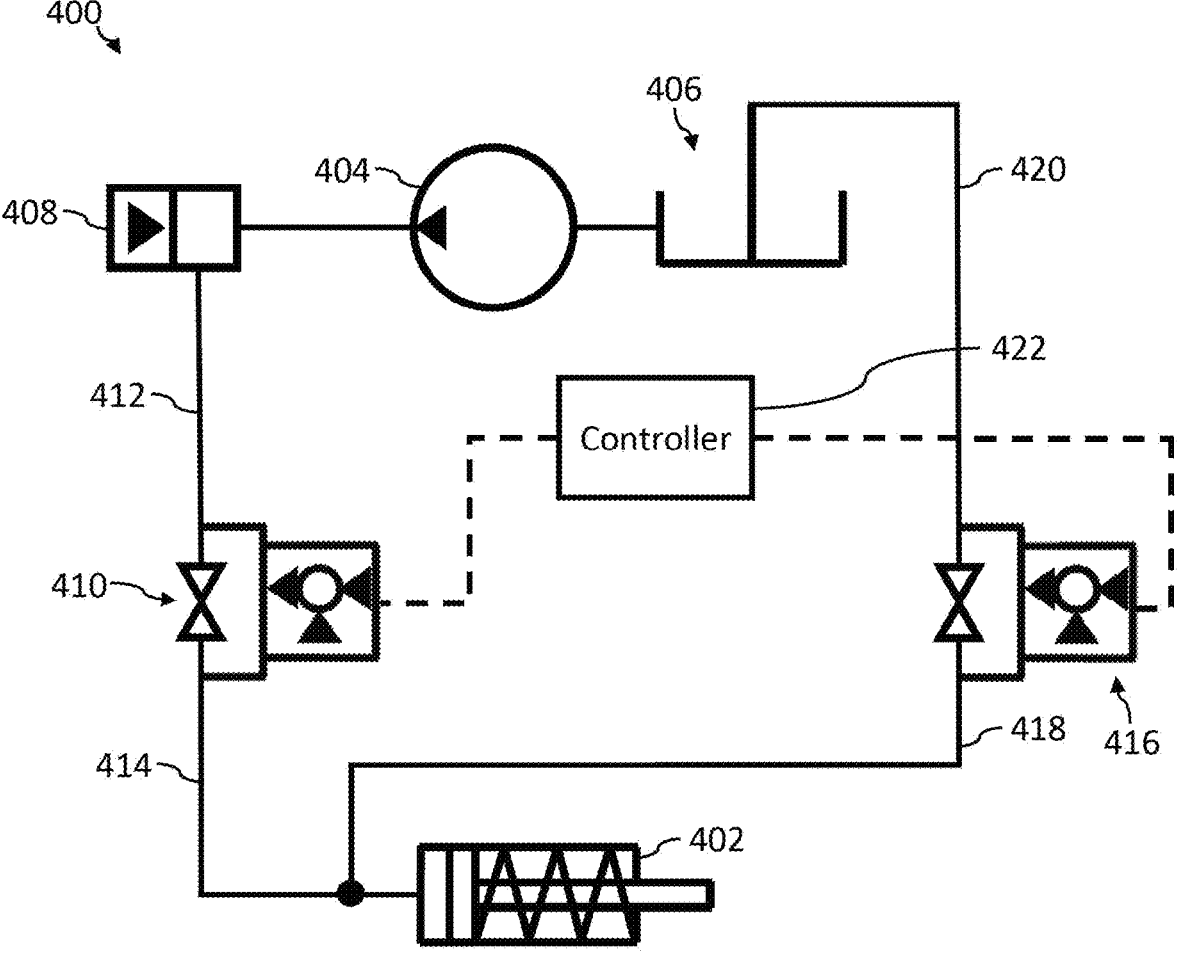
FIG. 4 is a schematic drawing of a hydraulic circuit with a single-acting actuation piston, in accordance with the present systems, devices, and methods.

FIG. 4 is a schematic drawing of a hydraulic circuit 400 with a single-acting actuation piston 402, in accordance with the present systems, devices, and methods. Hydraulic circuit 400 comprises a hydraulic pump 404, a reservoir 406, and an accumulator 408. Actuation piston 402 is hydraulically coupled to accumulator 408 through a pressure valve 410 and hoses 412 and 414 for a forward path, and through an exhaust valve 416 and hoses 418 and 420 for a return path.

In the illustrated example implementation of FIG. 4, pressure valve 410 and exhaust valve 416 are electrohydraulic servo valves controlled by a controller 422. The electro-hydraulic servo valves are also referred to in the present application as servo valves and servo-controlled valves.

Controller 422 may be implemented by any suitable combination of hardware, software, and/or firmware. Controller 422 may include, for example one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used, including without limitation piezoelectric valves.

Hydraulic circuit 400 may be used in a hydraulically-powered robot. Instead of having a common motor (e.g., motor 120 of FIG. 1) and drive pistons (e.g., drive piston 122 of FIG. 1), a hydraulically-powered robot using hydraulic circuit 400 has a common pump, a reservoir, and an accumulator (pump 404, reservoir 406, and accumulator 408 of FIG. 4, respectively). Multiple actuation pistons (e.g., actuation piston 128 of FIG. 1) can be hydraulically coupled in a forward path by hoses from the accumulator, and a return path by hoses to the reservoir. A set of independently controllable servo valves can be used to control which forward (or pressure) hoses and return (or exhaust) hoses are activated/deactivated at any given time.

Hydraulic circuit 400 may be used, in particular, for controlling an end effector of a robotic arm. As described above, in some implementations, there are eighteen (18) DOFs, including two double-acting DOFs, twenty (20) hoses entering the hand and twenty (20) hoses leaving the hand, and forty (40) servo-controlled valves (20 pressure valves and 20 exhaust valves).

It can be desirable for the elements of hydraulic circuit 400 to be integrated with the robotic arm. Integration can include locating elements of hydraulic circuit 400 in an interior of the robotic arm and/or on an exterior surface of the robotic arm. In some implementations, elements of hydraulic circuit 400 are integrated with the forearm, wrist, and/or hand of the robotic arm. It can be advantageous to avoid, or minimize, routing hydraulic hoses through joints and/or pivot points, for example, shoulder or elbow joints of the robotic arm. In some implementations, an outer diameter of hydraulic hoses is less than one-sixteenth of an inch (1/16 in.). In some implementations, the servo-controlled valves are miniaturized. In some implementations, the hydraulic pump, reservoir, and accumulator are integrated with the robotic arm. In some implementations, the hydraulic pump, reservoir, and accumulator are integrated with the forearm, wrist, and/or hand of the robotic arm.

FIGS. 6, 7, 8, 9, and 10 (below) are schematic drawings of example implementations of a hydraulically-powered robot using hydraulic circuit 400 of FIG. 4.

Figure 5:
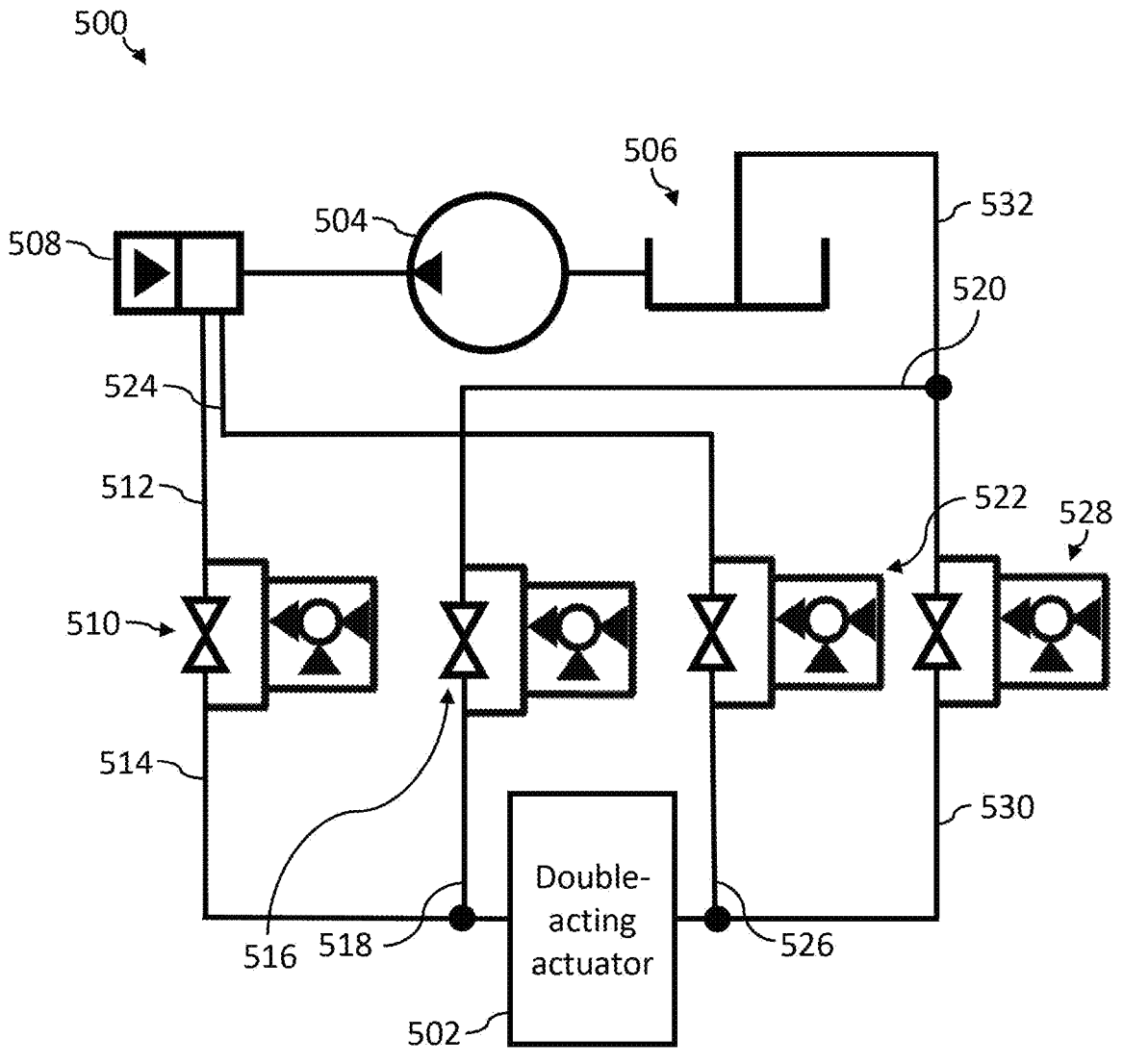
FIG. 5 is a schematic drawing of a hydraulic circuit with a double-acting actuation piston, in accordance with the present systems, devices, and methods.

FIG. 5 is a schematic drawing of a hydraulic circuit 500 with a double-acting actuation piston 502, in accordance with the present systems, devices, and methods. Hydraulic circuit 500 comprises a hydraulic pump 504, a reservoir 506, and an accumulator 508. Actuation piston 502 is a double-acting actuation piston that can provide a push and a pull action. For the push action, actuation piston 502 is hydraulically coupled to accumulator 508 through a pressure valve 510 and hoses 512 and 514 for a forward path, and through an exhaust valve 516 and hoses 518 and 520 for a return path. For the pull action, actuation piston 502 is hydraulically coupled to accumulator 508 through a pressure valve 522 and hoses 524 and 526 for a forward path, and through an exhaust valve 528 and hoses 530 and 532 for a return path.

In the illustrated example implementation of FIG. 5, valves 510, 516, 522, and 528 are servo-controlled valves controlled by a controller (not shown in FIG. 5 for clarity of illustration). In other implementations, other suitable types of valves may be used, including without limitation piezoelectric valves.

Hydraulically-Powered Robots with a Common Pump

Figure 6:
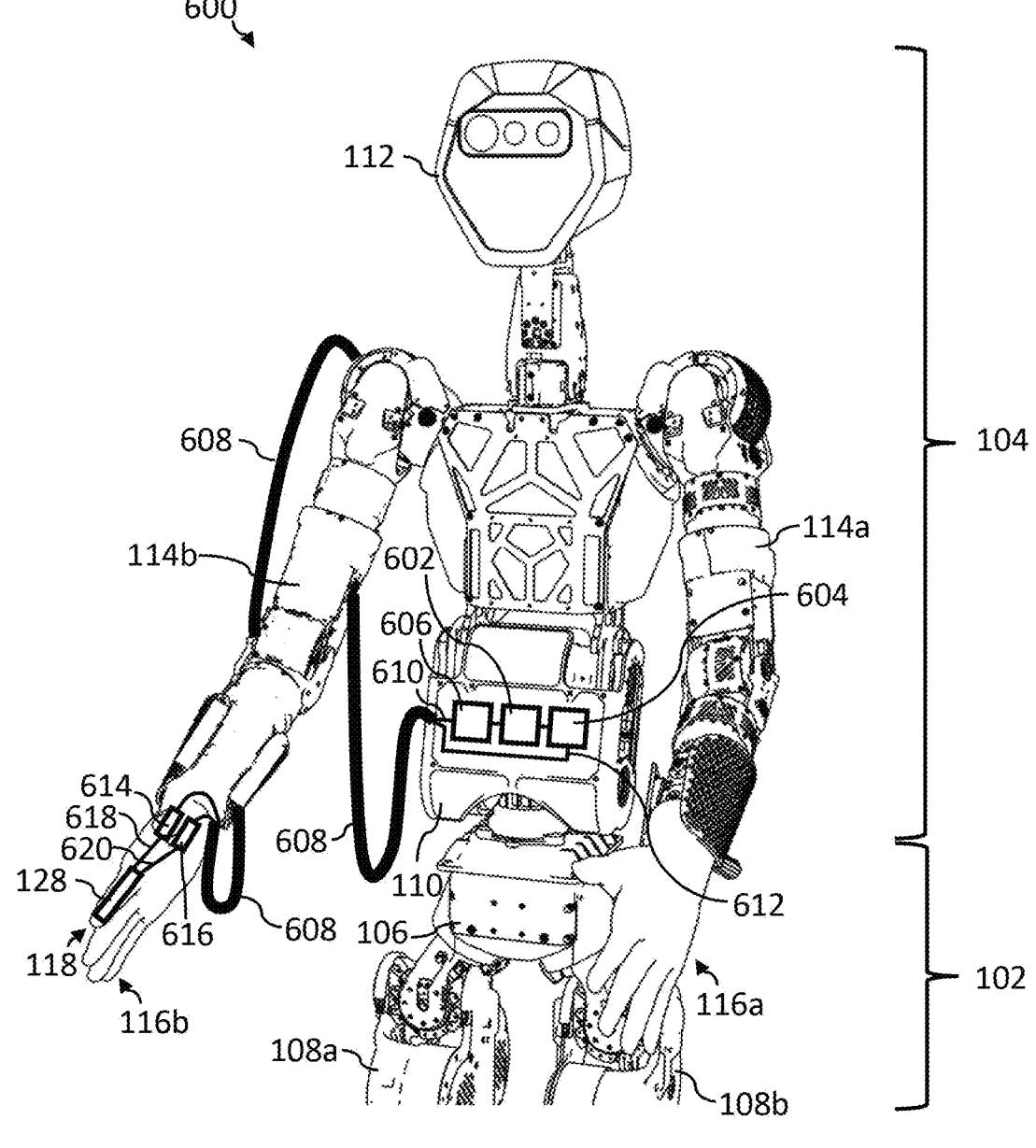
FIG. 6 is a schematic diagram of an example implementation of a hydraulically-powered robot comprising the hydraulic circuit of FIG. 4, in accordance with the present systems, devices, and methods.

FIG. 6 is a schematic diagram of an example implementation of a hydraulically-powered robot 600 comprising hydraulic circuit 400 of FIG. 4, in accordance with the present systems, devices, and methods. Components of robot 600 that are the same as, or similar to, components of robot 100 of FIG. 1 have the same reference numerals.

Robot 600 comprises a hydraulic pump 602, a reservoir 604, and an accumulator 606, housed in torso 110. In some implementations, pump 602, reservoir 604, and/or accumulator 606 may be integrated with the back of robot 600, e.g., carried in a backpack that is affixed to or worn by robot 600. Robot 600 further comprises a bundle of hoses 608 that includes hoses 610 and 612. Hose 610 provides a hydraulic coupling between accumulator 606 and valve 614. Hose 612 provides a hydraulic coupling between valve 616 and reservoir 604.

Robot 600 further comprises hose 618 which runs from valve 614 to actuation piston 128, and hose 620 which runs from actuation piston 128 to valve 616. Hoses 610 and 618, and valve 614, provide a forward path to actuation piston 128. Hoses 612 and 620, and valve 616 provide a return path to actuation piston 128. In the implementation of hydraulically-powered robot 600, pump 602, reservoir 604, and/or accumulator 606 may be common to multiple hydraulic control systems. For example, pump 602, reservoir 604, and accumulator 606 may be utilized to hydraulically control actuation of hand 116b via bundle of hoses 608 and also to control hand 116a via a separate bundle of hoses not illustrated in FIG. 6 to reduce clutter.

Figure 7:
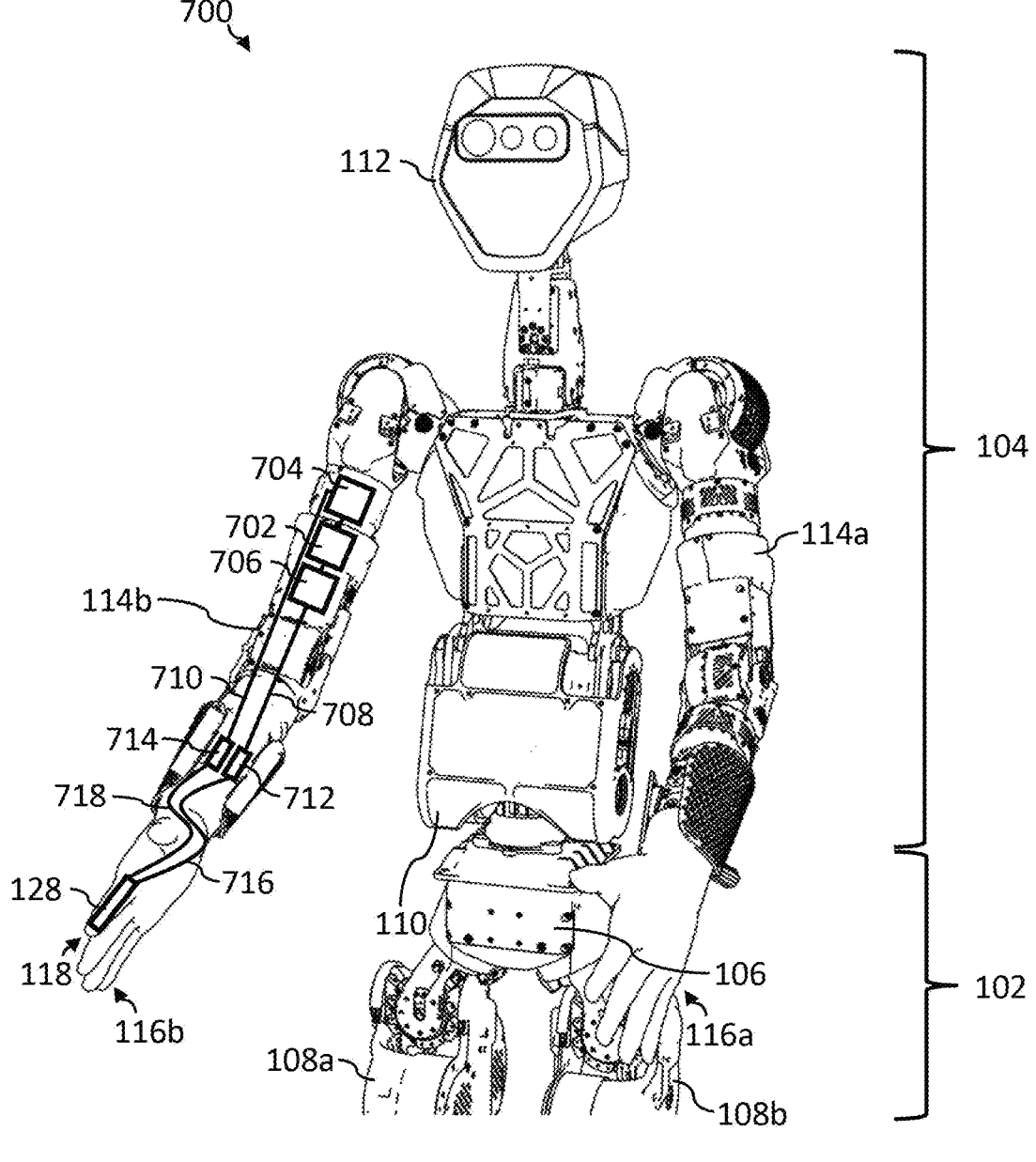
FIG. 7 is a schematic drawing of an example implementation of a hydraulically-powered robot with a hydraulic pump integrated with an arm of the robot, in accordance with the present systems, devices, and methods.

FIG. 7 is a schematic drawing of an example implementation of a hydraulically-powered robot 700 with a hydraulic pump 702 integrated with arm 114b of robot 700, in accordance with the present systems, devices, and methods. Components of robot 700 that are the same as, or similar to, components of robot 100 of FIG. 1 have the same reference numerals.

Robot 700 differs from robot 600 of FIG. 6 in the distribution of components of the hydraulic system and the routing of hydraulic hoses to actuation pistons (e.g., actuation piston 128). As described with reference to FIG. 6, robot 600 includes a bundle of hoses 608 that runs externally from torso 110 to hand 116b. Bundle of hoses 608 can have a number of disadvantages, as described above. Robot 700 comprises a hydraulic pump 702, a reservoir 704, and an accumulator 706 that are housed in robotic arm 114b. Housing hydraulic pump 702, reservoir 704, and accumulator 706 in robotic arm 114b advantageously eliminates the external bundle of hoses.

Robot 700 further comprises hoses 708 and 710. Hose 708 provides a hydraulic coupling between accumulator 706 and a pressure valve 712. Hose 710 provides a hydraulic coupling between an exhaust valve 714 and reservoir 704. Robot 700 further comprises hose 716 which runs from pressure valve 712 to actuation piston 128, and hose 718 which runs to exhaust valve 714 from actuation piston 128. Hoses 708 and 716, and pressure valve 712, provide a forward path to actuation piston 128. Hoses 710 and 718, and exhaust valve 714 provide a return path to actuation piston 128.

Figure 8:
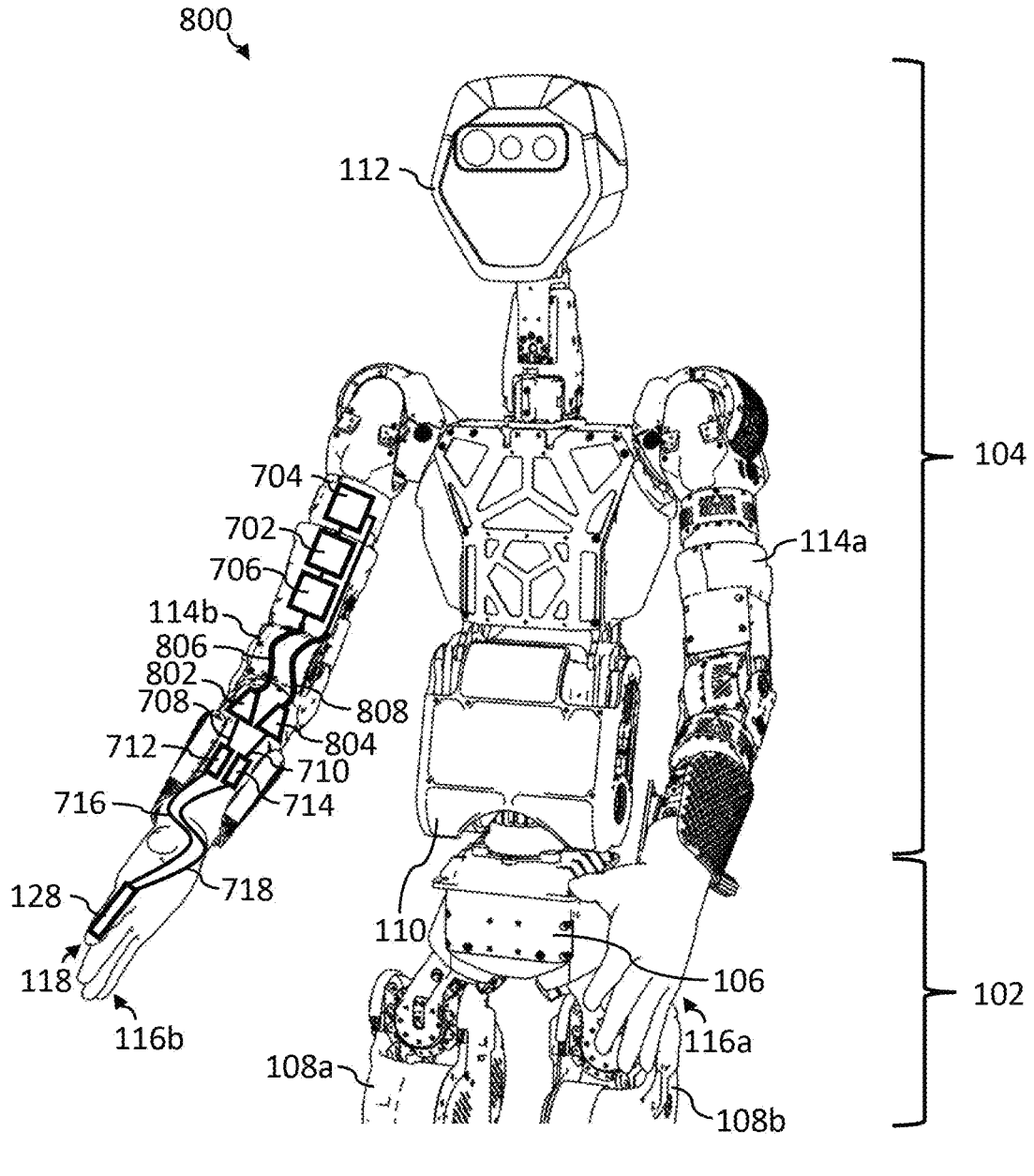
FIG. 8 is a schematic drawing of an example implementation of a hydraulically-powered robot with a hydraulic pump and manifolds integrated with an arm of the robot, in accordance with the present systems, devices, and methods.

FIG. 8 is a schematic drawing of another example implementation of a hydraulically-powered robot 800 with a hydraulic pump 702 and manifolds 802 and 804 integrated with arm 114b of robot 800, in accordance with the present systems, devices, and methods. Manifolds 802 and 804 include a pressure manifold 802 and an exhaust manifold 804. Components of robot 800 that are the same as, or similar to, components of robot 700 of FIG. 7 have the same reference numerals.

Robot 800 differs from robot 700 of FIG. 7 in, among other things, the arrangement of hoses between accumulator 706 and reservoir 704, and pressure valve 712 and exhaust valve 714. Robot 800 includes a hose 806 that runs from accumulator 706 to pressure manifold 802, and a hose 808 that runs from exhaust manifold 804 to reservoir 704. In implementations that include multiple actuators, and concomitant multiple pressure and exhaust valves, the arrangement described above with reference to FIG. 8 can advantageously reduce the number of hoses routed between the pressure and exhaust valves, and the accumulator and the reservoir, respectively.

Figure 9:
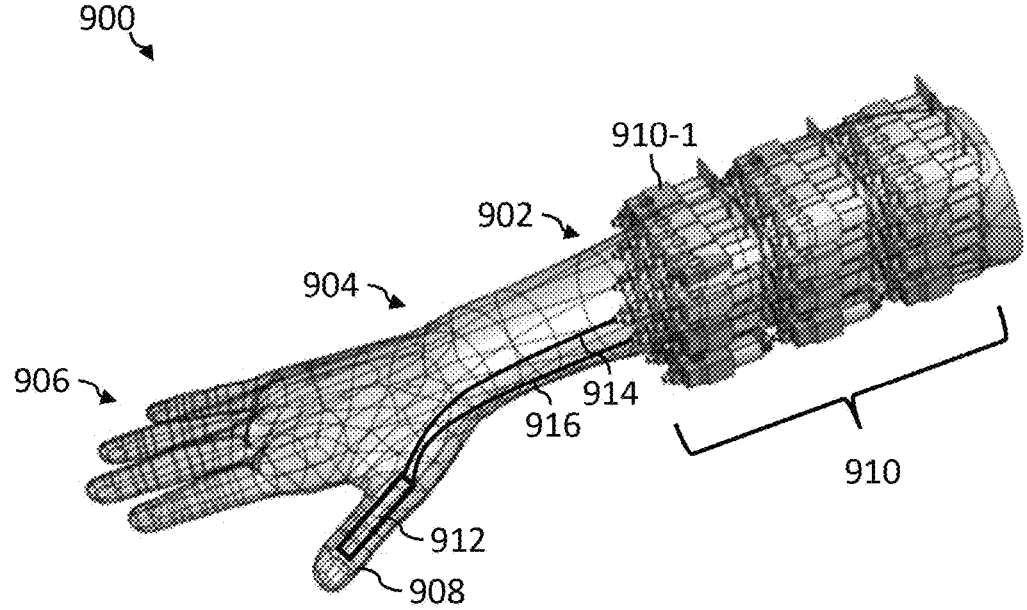
FIG. 9 is a schematic drawing of an example implementation of a portion of a hydraulic system in a forearm, wrist, and hand of a robot, in accordance with the present systems, devices, and methods.

FIG. 9 is a schematic drawing of an example implementation of a portion of a hydraulic system in a forearm 902, wrist 904, and hand 906 of a robot, in accordance with the present systems, devices, and methods. Hand 906 includes a digit 908.

Forearm 902 includes a set of valves 910 which is integrated with forearm 902. Valves 910 include valve 910-1. (Only one valve is separately labeled for clarity of illustration.) Valves 910 may include pressure valves and exhaust valves. Valves 910 may include electrohydraulic servo valves and/or piezoelectric valves, and may be operated by a controller (not shown in FIG. 9, e.g., controller 422 of FIG. 4).

Digit 908 includes an actuation piston 912 integrated with digit 908. Actuation piston 912 is hydraulically coupled to valves 910 via a pressure hose 914 and an exhaust hose 916. Hydraulically-Powered Robots with Multiple Hydraulically-Isolated Hydraulic Systems Throughout this specification and the appended claims, two hydraulic systems are referred to as being "hydraulically-isolated" from one another if the two hydraulic systems are not hydraulically coupled. For example, a first hydraulic system is hydraulically-isolated from a second hydraulic system if no hydraulic component(s) of the first hydraulic system is/are hydraulically coupled to or with any hydraulic component(s) of the second hydraulic system. In some implementations, hydraulically-isolated systems may share physical/mechanical couplings and/or each be coupled to a common source of electrical power.

Figure 10:
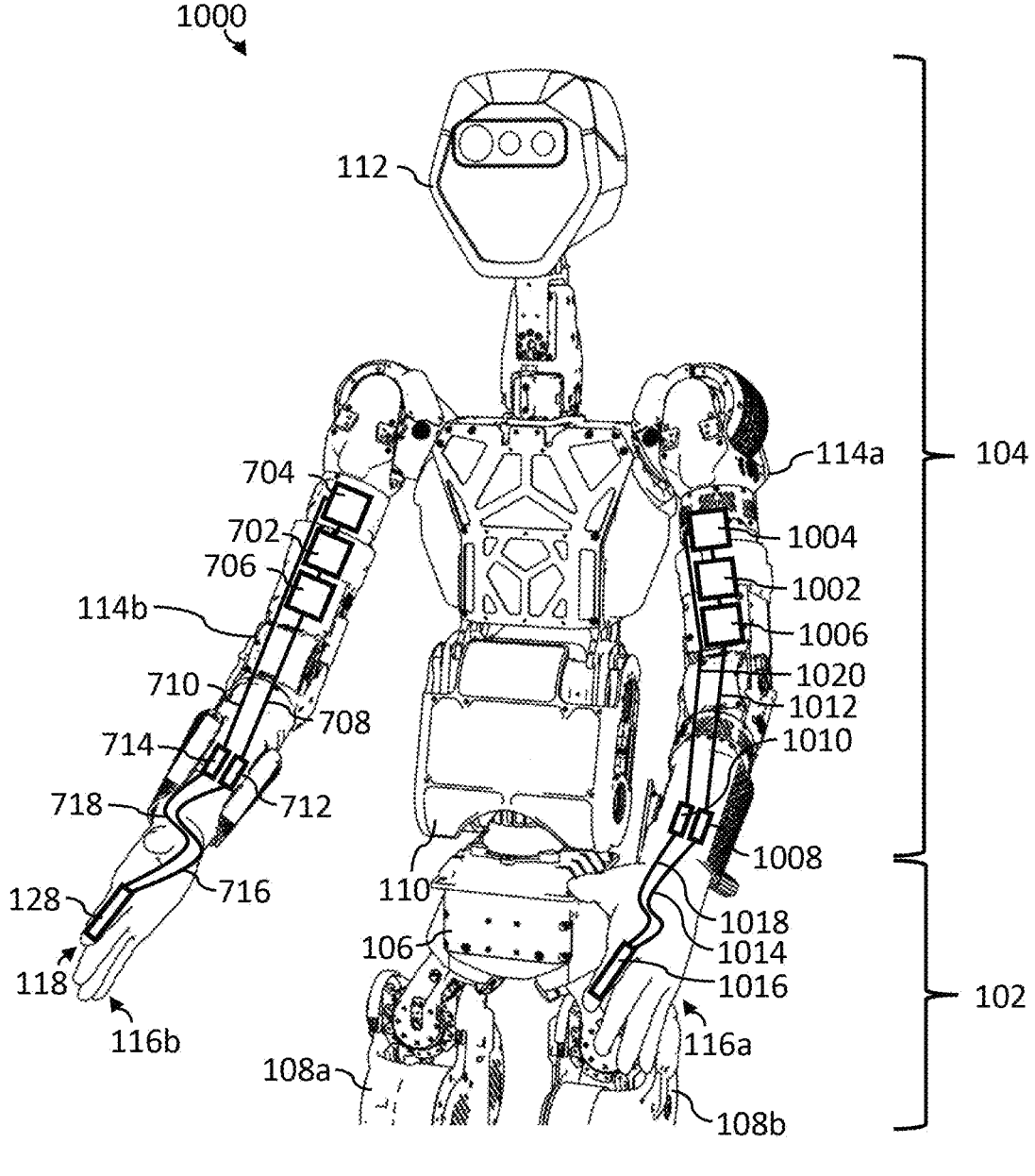
FIG. 10 is a schematic drawing of an example implementation of a hydraulically-powered robot with multiple hydraulically-isolated hydraulic systems, in accordance with the present systems, devices, and methods.

FIG. 10 is a schematic drawing of an example implementation of a hydraulically-powered robot 1000 with multiple (i.e., at least two) hydraulically-isolated hydraulic systems, in accordance with the present systems, devices, and methods.

Components of robot 1000 that are the same as, or similar to, components of robot 700 of FIG. 7 have the same reference numerals.

Robot 1000 differs from robot 700 of FIG. 7 with the inclusion in robot 1000 of a second hydraulic system that is hydraulically-isolated from the first hydraulic system. The first hydraulic system is described above with reference to FIG. 7. The second hydraulic system of robot 1000 comprises a second hydraulic pump 1002, a second reservoir 1004, and a second accumulator 1006. In other words, first pump 702, first reservoir 704, and first accumulator 706 do not provide common control of both hands 116*b* and 116*a*, but rather first pump 702, first reservoir 704, and first accumulator 706 provide control of hand 116*b* and a second, hydraulically-isolated system comprising second pump

1002, second reservoir 1004, and second accumulator 1006 provides control of hand 116*a*.

The second hydraulic system further comprises a pressure valve 1008 and an exhaust valve 1010. A hose 1012 hydraulically couples accumulator 1006 to a first port of pressure valve 1008, and a hose 1014 hydraulically couples a second port of pressure valve 1008 to actuation piston 1016 in hand 116*a*. A hose 1018 hydraulically couples actuation piston to a first port of exhaust valve 1010, and a hose 1020 hydraulically couples a second port of exhaust valve 1010 to reservoir 1004.

The second hydraulic system of robot 1000 is hydraulically-isolated from the first hydraulic system. The first and the second hydraulic systems have separate hydraulic pumps 702 and 1002, respectively.

Though the example implementation of FIG. 10 of a hydraulically-powered robot with multiple hydraulic systems includes only two hydraulic systems, a person of skill in the art will appreciate that a hydraulically-powered robot with multiple hydraulic systems may include more than two hydraulic systems. In some implementations, at least some of the more than two hydraulic systems may be hydraulically-isolated. In some implementations, at least some of the more than two hydraulic systems may share a common hydraulic pump.

It can be beneficial for a hydraulically-powered robot (e.g., robot 1000 of FIG. 10) to have multiple, discrete, hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses from a single shared pump to multiple components or devices located in different regions of the robot, especially without employing undesirable external tubing bundles as previously described. A separate, discrete hydraulic system dedicated to each single hydraulically-actuated component or device, or each dedicated to a respective subset of the multiple hydraulically-actuated components or devices, may be more localized and better integrated with the robot, e.g., more readily adapted to fit within a desired form factor.

The various implementations of the systems, devices, and methods described herein may employ technologies and/or techniques that facilitate the miniaturization of hydraulic systems and/or enable the integration of hydraulic systems in a humanoid form factor. Examples of such technologies and techniques are described in U.S. Provisional Patent Application Ser. No. 63/197,653, filed Jun. 7, 2021 and entitled "TAPERED HYDRAULIC HOSE, METHODS OF MAKING, AND APPLICATIONS THEREOF IN ROBOT SYSTEMS"; U.S. Provisional Patent Application Ser. No. 63/220,584, filed Jul. 12, 2021 and entitled "HYDRAULIC FITTING, AND APPLICATIONS THEREOF IN ROBOT SYSTEMS"; U.S. Provisional Patent Application Ser. No. 63/223,335, filed Jul. 19, 2021 and entitled "HYDRAULIC FITTING, AND APPLICATIONS THEREOF IN ROBOT SYSTEMS"; U.S. Provisional Patent Application Ser. No. 63/224,910, filed Jul. 23, 2021 and entitled "HELICAL HYDRAULIC HOSE CONFIGURATION"; and U.S. Provisional Patent Application Ser. No. 63/273,104, filed Oct. 28, 2021 and entitled "HYDRAULIC VALVE, AND APPLICATIONS THEREOF IN ROBOT SYSTEMS"; all of which are incorporated herein by reference in there entirety.

Throughout this specification and the appended claims, the term "hydraulically-powered robot" is used to describe a robot that has at least one physically actuatable component for which the actuation is powered or controlled hydraulically. Unless the specific context requires otherwise, a hydraulically-powered robot as described herein may include other (i.e., non-hydraulic) control mechanisms in addition or alternative to hydraulics for one or more actuatable components.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

The present systems, devices, and methods claim priority from U.S. Provisional Patent Application Ser. No. 63/191, 732, filed May 21, 2021 and entitled "SYSTEMS, DEVICES, AND METHODS FOR A HYDRAULIC ROBOTIC ARM", which is incorporated herein by reference in its entirety.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robot comprising:

a body;

a first robotic arm physically coupled to the body, the first robotic arm comprising a first end effector; and a first hydraulic system comprising a first plurality of hydraulic components, the first hydraulic system operable to control the first end effector, wherein the first plurality of hydraulic components are integrated with the first robotic arm, wherein the first plurality of hydraulic components comprises:

a hydraulic pump;

a reservoir for storing a first partial volume of a hydraulic fluid, the reservoir hydraulically coupled to an inlet of the hydraulic pump, the reservoir configurable to provide a positive pressure to the inlet of the hydraulic pump;

an accumulator for holding a second partial volume of the hydraulic fluid under pressure, the accumulator hydraulically coupled to an outlet of the hydraulic pump;

a set of actuators, each actuator comprising an actuation piston, each actuation piston operable to drive a respective actuation of the first end effector;

a plurality of hoses, each hose of the plurality of hoses containing a respective volume of the hydraulic fluid;

a plurality of pressure valves, each pressure valve operable to control a hydraulic coupling of the accumulator to a respective actuation piston via a respective first at least one of the plurality of hoses; and a plurality of exhaust valves, wherein each exhaust valve is operable to control a hydraulic coupling of the respective actuation piston to the reservoir via a respective second at least one of the plurality of hoses.

2. The robot of claim 1, further comprising:

a second robotic arm physically coupled to the body, the second robotic arm comprising a second end effector; and a second hydraulic system comprising a second plurality of hydraulic components, the second hydraulic system operable to control the second end effector, the second plurality of hydraulic components integrated with the second robotic arm, wherein the second hydraulic system is hydraulically-isolated from the first hydraulic system.

3. The robot of claim 1, further comprising:

a second robotic arm physically coupled to the body, the second robotic arm comprising a second end effector; and a second hydraulic system comprising a second plurality of hydraulic components, the second hydraulic system operable to control the second end effector, the second plurality of hydraulic components integrated with the second robotic arm, wherein the first hydraulic system and the second hydraulic system share a common hydraulic pump.

4. The robot of claim 1, wherein the first end effector is a hand, the hand comprising a plurality of digits, each digit of the plurality of digits comprising at least one respective actuator of the set of actuators.

5. The robot of claim 4, wherein each of the set of actuators provides a respective degree of freedom.

6. The robot of claim 1, wherein at least one hydraulic component of the first plurality of hydraulic components is located in an interior of the first robotic arm.

7. The robot of claim 1, wherein at least one hydraulic component of the first plurality of hydraulic components is mounted on an exterior surface of the first robotic arm.

8. The robot of claim 1, wherein:

the plurality of pressure valves include at least one electrohydraulic servo pressure valve, each electrohydraulic servo pressure valve operable to control the hydraulic coupling of the accumulator to the respective actuation piston; and the plurality of exhaust valves include at least one electrohydraulic servo exhaust valve, each electrohydraulic servo exhaust valve operable to control the hydraulic coupling of the respective actuation piston to the reservoir.

9. The robot of claim 8, further comprising a controller, the controller operable to open and close the at least one electrohydraulic servo pressure valve and the at least one electrohydraulic servo exhaust valve.

10. A robot comprising:

a body;

a first robotic arm physically coupled to the body, the first robotic arm comprising a first end effector; and a first hydraulic system comprising a first plurality of hydraulic components, the first hydraulic system operable to control the first end effector, wherein the first plurality of hydraulic components are integrated with the first robotic arm, wherein the first plurality of hydraulic components comprises:

a hydraulic pump;

a reservoir hydraulically coupled by a first hose to an inlet of the hydraulic pump;

an accumulator hydraulically coupled by a second hose to an outlet of the hydraulic pump;

a first pressure valve, a first port of the first pressure valve hydraulically coupled by a third hose to the accumulator;

an actuator hydraulically coupled by a fourth hose to a second port of the first pressure valve; and a first exhaust valve, a first port of the first exhaust valve hydraulically coupled by a fifth hose to the actuator, a second port of the first exhaust valve hydraulically coupled by a sixth hose to the reservoir, wherein the hydraulic pump, the reservoir, the accumulator, the first pressure valve, the first exhaust valve, the actuator, and the first, the second, the third, the fourth, the fifth, and the sixth hoses form a hydraulic circuit.

11. The robot of claim 10, wherein a respective outer diameter of each of the first, the second, the third, the fourth, the fifth, and the sixth hoses is less than or equal to one-sixteenth of an inch (1/16 in.).

12. The robot of claim 10, wherein the actuator comprises a single actuation piston.

13. The robot claim 10, the first plurality of hydraulic components further comprising:

a second pressure valve, a first port of the second pressure valve hydraulically coupled by a seventh hose to the accumulator and a second port of the second pressure valve hydraulically coupled by an eighth hose to the actuator; and a second exhaust valve, a first port of the second exhaust valve hydraulically coupled by an ninth hose to the actuator and a second port of the second exhaust valve hydraulically coupled by a tenth hose to the reservoir, wherein the actuator comprises a double actuation piston, and whereby the actuator becomes double-acting.

14. The robot of claim 10, wherein the first port of the first pressure valve is hydraulically coupled by the third hose to the accumulator via a pressure manifold, and the second port of the first exhaust valve is hydraulically coupled by the tenth hose to the reservoir via an exhaust manifold.

15. The robot of claim 10, further comprising:

a second robotic arm physically coupled to the body, the second robotic arm comprising a second end effector; and a second hydraulic system comprising a second plurality of hydraulic components, the second hydraulic system operable to control the second end effector, the second plurality of hydraulic components integrated with the second robotic arm, wherein the second hydraulic system is hydraulically-isolated from the first hydraulic system.

16. The robot of claim 10, further comprising:

a second robotic arm physically coupled to the body, the second robotic arm comprising a second end effector; and a second hydraulic system comprising a second plurality of hydraulic components, the second hydraulic system operable to control the second end effector, the second plurality of hydraulic components integrated with the second robotic arm, wherein the first hydraulic system and the second hydraulic system share a common hydraulic pump.

17. The robot of claim 10, wherein the first end effector is a hand, the hand comprising a digit, and the digit comprises the actuator.

18. The robot of claim 10, wherein at least one hydraulic component of the first plurality of hydraulic components is located in an interior of the first robotic arm.

19. The robot of claim 10, wherein at least one hydraulic component of the first plurality of hydraulic components is mounted on an exterior surface of the first robotic arm.

* * * * *